(12) United States Patent
Dishong

(10) Patent No.: US 11,871,740 B2
(45) Date of Patent: Jan. 16, 2024

(54) PROTECTIVE FISHING HOOK AND LURE COVER

(71) Applicant: Linda Dishong, Imler, PA (US)

(72) Inventor: Linda Dishong, Imler, PA (US)

( * ) Notice: Subject to any disclaimer, the term of this patent is extended or adjusted under 35 U.S.C. 154(b) by 0 days.

(21) Appl. No.: 17/347,921

(22) Filed: Jun. 15, 2021

(65) Prior Publication Data

US 2021/0386047 A1 Dec. 16, 2021

Related U.S. Application Data

(60) Provisional application No. 63/038,984, filed on Jun. 15, 2020.

(51) Int. Cl.
*A01K 97/06* (2006.01)

(52) U.S. Cl.
CPC .................... *A01K 97/06* (2013.01)

(58) Field of Classification Search
CPC ........ A01K 97/06; A01K 97/08; A01K 87/00; A01K 87/009
USPC .................................... 43/25.2, 26
See application file for complete search history.

(56) References Cited

U.S. PATENT DOCUMENTS

| | | | | |
|---|---|---|---|---|
| 589,229 A * | 8/1897 | Strack | .................. | B65F 1/1607 |
| | | | | 220/4.21 |
| 2,715,292 A | 8/1955 | Williams | | |
| 2,733,533 A | 2/1956 | Standard | | |
| 2,767,502 A * | 10/1956 | Reynolds | ............... | A01K 97/06 |
| | | | | 43/57.1 |
| 2,825,992 A | 3/1958 | Miller | | |
| 3,949,933 A * | 4/1976 | Giambrone | .......... | B65D 11/184 |
| | | | | 220/4.21 |
| 4,083,470 A * | 4/1978 | Stefanik | ................... | B60J 7/141 |
| | | | | 220/826 |
| 4,523,704 A * | 6/1985 | Washington | ............ | B60R 9/055 |
| | | | | 224/329 |
| 4,757,637 A * | 7/1988 | Christensen | ........... | A01K 93/00 |
| | | | | 43/57.1 |
| D311,449 S * | 10/1990 | Paschal | ......................... | D3/904 |
| 5,263,276 A | 11/1993 | Washington | | |
| D355,071 S * | 2/1995 | Stull | .......................... | D22/139 |
| 5,475,942 A * | 12/1995 | Tatum | .................... | A01K 97/06 |
| | | | | 43/25.2 |
| 5,517,783 A * | 5/1996 | Edgar | .................... | A01K 97/06 |
| | | | | 43/57.1 |

(Continued)

FOREIGN PATENT DOCUMENTS

| | | | | | |
|---|---|---|---|---|---|
| AU | 20020023381 A | * | 9/2001 | ............. | A01K 97/06 |
| GB | 2269368 A | * | 2/1994 | ............. | A01K 97/06 |

*Primary Examiner* — Timothy D Collins
*Assistant Examiner* — Maria E Graber
(74) *Attorney, Agent, or Firm* — Global Intellectual Property Agency; Daniel Boudwin

(57) ABSTRACT

A protective fishing hook and lure cover is provided. The protective fishing hook and lure cover includes a first receptacle and a second receptacle. The first receptacle and the second receptacle are connected by a hinge. The first receptacle and the second receptacle each have a base with a number of perimeter walls connected to it. A number of apertures are formed between the perimeter walls of the first receptacle and the perimeter walls of the second receptacle. A latch is also placed on the first receptacle and the second receptacle. The latch is designed to hold the first receptacle and the second receptacle in a closed configuration.

1 Claim, 2 Drawing Sheets

(56) References Cited

U.S. PATENT DOCUMENTS

| | | | | |
|---|---|---|---|---|
| D405,499 S | * | 2/1999 | Beauvais | D22/139 |
| 6,085,455 A | * | 7/2000 | Bracken | A01K 97/08 43/25 |
| 6,606,814 B1 | * | 8/2003 | Weaver | A01K 97/06 43/25.2 |
| 7,322,149 B1 | * | 1/2008 | Quintero | A01K 97/08 206/315.11 |
| 7,389,608 B1 | * | 6/2008 | MacKay | A01K 97/20 206/315.11 |
| D663,378 S | * | 7/2012 | Osman | D22/134 |
| 9,357,757 B2 | * | 6/2016 | London | A01K 97/06 |
| 9,468,201 B1 | * | 10/2016 | McGuire | A01K 97/06 |
| 2002/0023381 A1 | * | 2/2002 | Chambeyron | A01K 97/08 43/54.1 |
| 2002/0079313 A1 | * | 6/2002 | Grayson | A01K 97/06 43/57.1 |
| 2005/0091910 A1 | | 5/2005 | Jang | |
| 2007/0033858 A1 | * | 2/2007 | Marino | A01K 97/06 43/54.1 |
| 2009/0094881 A1 | * | 4/2009 | Konopa | A01K 97/06 43/57.1 |
| 2011/0073599 A1 | * | 3/2011 | Nieves | B65F 1/1607 220/212 |
| 2011/0232339 A1 | * | 9/2011 | Norman | A01K 97/08 70/159 |
| 2013/0025180 A1 | * | 1/2013 | Norman | A01K 97/08 43/26 |
| 2015/0327529 A1 | * | 11/2015 | Zimmerman | A01K 99/00 43/54.1 |
| 2020/0062452 A1 | * | 2/2020 | Taylor | B65D 43/162 |

\* cited by examiner

PROTECTIVE FISHING HOOK AND LURE COVER

CROSS REFERENCE TO RELATED APPLICATIONS

This application claims the benefit of U.S. Provisional Application No. 63/038,984 filed on Jun. 15, 2020. The above identified patent application is herein incorporated by reference in its entirety to provide continuity of disclosure.

BACKGROUND OF THE INVENTION

The present invention relates to a protective fishing hook cover. More specifically, the present invention provides a mechanism through which a fishing hook and lure may be covered and protected.

Many people enjoy fishing. Though there are many types of fishing, most of the time, fishing involves the use of a fishing rod. Fishing rods typically comprise an elongated rod with a reel mounted on a proximal end of the rod. The reel comprises a line that can be wound around the wheel and fed through a number of guides to the tip of the fishing rod. The reel is designed to enable the user to cast the line from the fishing rod. Generally, the line will comprise a hook with a type of baiting mechanism disposed at the end of the line. When the hook and baiting mechanism are submerged in water, they are used to attract and capture wildlife. Artificial fishing lures can be used as a baiting mechanism and are desirable for many purposes in many situations.

During non-active fishing times, such as transport and storage, fishing hooks and lures can be dangerous if they are left uncovered. For example, lures and hooks can become tangled with other fishing rods. Untangling fishing lines can be a frustrating and time-consuming process. Furthermore, uncovered fishing hooks and lures can snag fabric materials in vehicles, boats or other locations that fishing rods may be stored or transported, causing damage which may be expensive to repair. Uncovered lures and hooks may also result in children, adults or pets getting hooked, which can be painful and, in some cases, require medical attention. Uncovered hooks and lures are also at an increased risk of damage from sun and weather as they are directly exposed to elements such as heat and moisture.

SUMMARY OF THE INVENTION

In view of the foregoing disadvantages inherent in the known types of fishing lure and hook storage methods now present in the prior art, the present invention provides a protective fishing hook and lure cover wherein the same can be utilized for providing convenience for the user when covering a protecting a fishing hook and lure on a fishing rod.

The present system comprises a first receptacle and a second receptacle. The first receptacle and the second receptacle are connected by a hinge. The first receptacle and the second receptacle each comprise a base with a plurality of perimeter walls extending upward therefrom. A pair of apertures is defined between the plurality of perimeter walls between the first receptacle and the second receptacle. A latch is also disposed on the first receptacle and the second receptacle. The latch is configured to hold the first receptacle and the second receptacle in a closed configuration.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
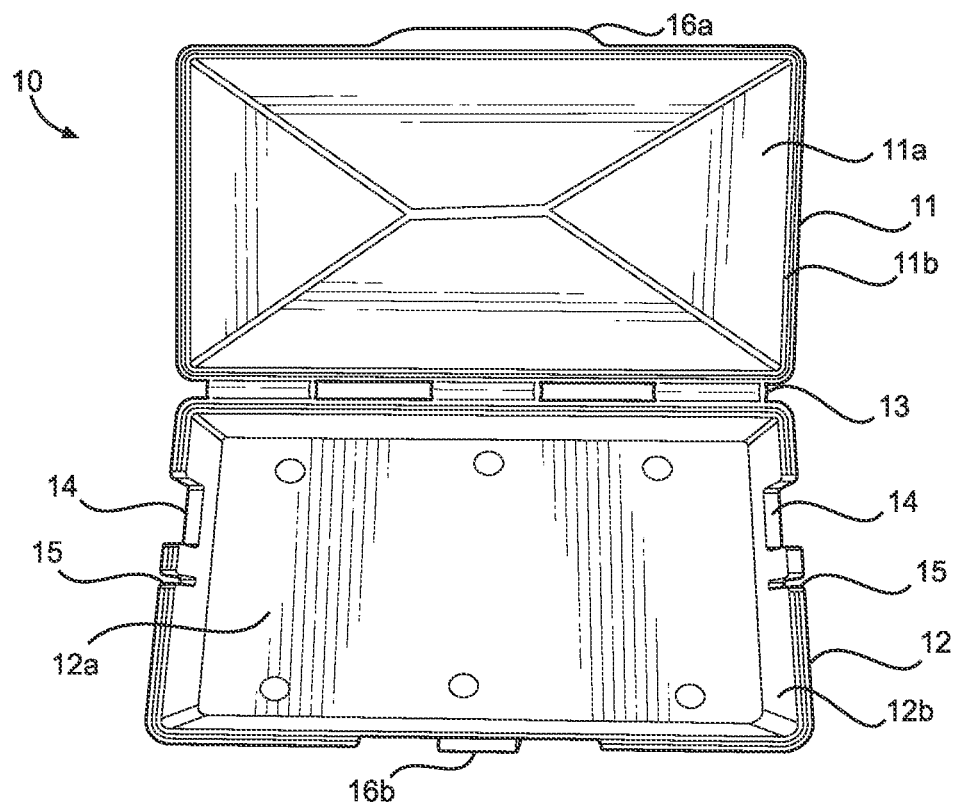
FIG. 1 shows a front view of an embodiment of the protective fishing hook and lure cover.

Reference is made herein to the attached drawings. Like reference numerals are used throughout the drawings to depict like or similar elements of the protective fishing hook and lure cover. The figures are intended for representative purposes only and should not be considered to be limiting in any respect.

Figure 4:
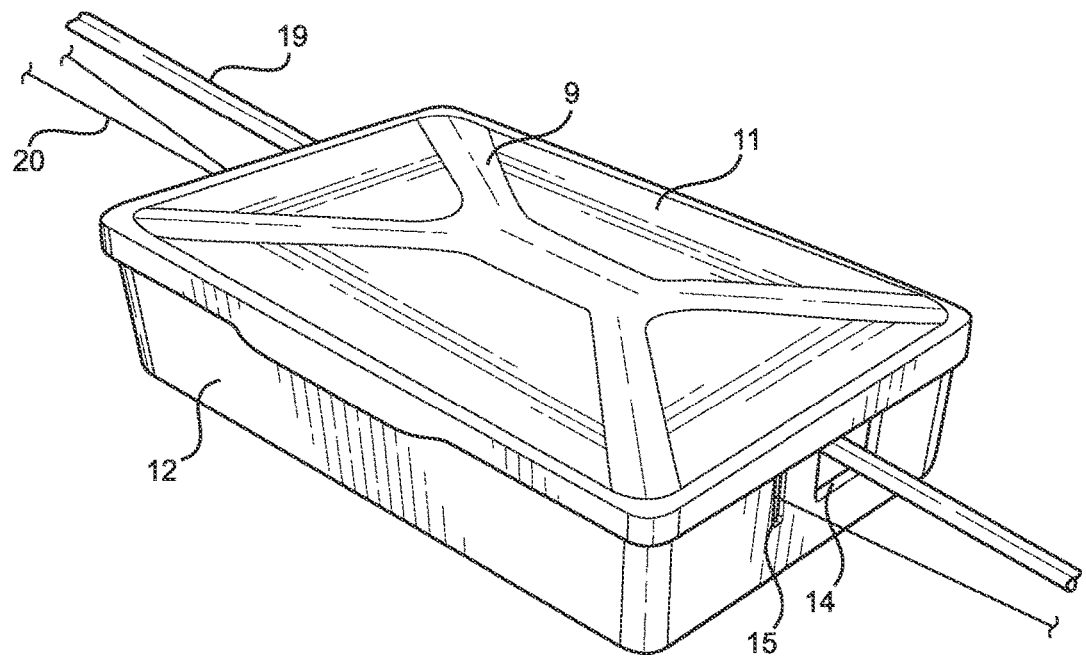
FIG. 4 shows a front demonstrative view of an embodiment of the protective fishing hook and lure cover in use.

Referring now to FIG. 1, there is shown a front view of an embodiment of the protective fishing hook and lure cover. The protective fishing hook and lure cover 10 comprises a first receptacle 11. The first receptacle 11 is connected to a second receptable 12. In the illustrated embodiment, the first receptacle 11 is connected to the second receptacle 12 via at least one hinge 13. As such, the first receptacle 11 may be placed into contact with the second receptacle 12, such that a closed housing (as shown in FIG. 4) may be formed.

The first receptacle 11 and the second receptacle 12 each comprise a base 11a, 12a. A plurality of perimeter walls extend upward from each base 11a, 12a. As such, each of the first receptacle 11 and the second receptacle 12 defined interior cavities configured to secure one or more desired objects therein.

In the illustrated embodiment, the plurality of apertures 14, 15 consists of a pair of apertures 14 and pair of slots 15. The pair of apertures 14, are defined in linear alignment. When looking at the apertures from the perspective of FIG. 1, the apertures 14 have an open top, a bottom surface parallel to base 12a, a front surface and a back surface perpendicular to base 12a, wherein the front surface is nearest to the latch 16b and the back surface is nearest to the hinges 13. The width of the pair of apertures 14 is defined as the distance span between the front and back of the surfaces. The pair of apertures 14 are offset from the center of the second receptacle 12 towards the hinges 13. The pair of slots 15 are defined in linear alignment. When looking at the slots from the perspective of FIG. 1, the slots 15 have a narrow open top, a narrow bottom surface parallel to base 12a, a front surface and a back surface perpendicular to base 12a, wherein the front surface and the back surface is centered in the second receptacle 12. The width of the slots 15 is defined as the is the distance span between the front and back of the surfaces. The slots 15 are oriented through the center of the second receptacle 12. This is to ensure that the lure will be centered under the maximum pitch of the hipped roof of the first receptacle 11.

A latch 16a, 16b is disposed on the first receptacle 11 and the second receptacle 12. The latch 16a, 16b is configured to hold the first receptacle 11 and the second receptacle 12 in a closed position. As such, the interior volume defined by the first receptacle 11 and the second receptacle will be held in a stable position capable of offering a level of protection to the contents of the housing (as shown in FIG. 4). In the illustrated embodiment, the latch 16a, 16b consists of a first latch member 16a disposed on a perimeter wall of the first receptacle 11 and a second latch member 16b disposed on a perimeter wall of the second receptacle 12. In the illustrated embodiment, the first latch member 16a is configured to be frictionally engaged by the second latch member 16b.

Figure 2:
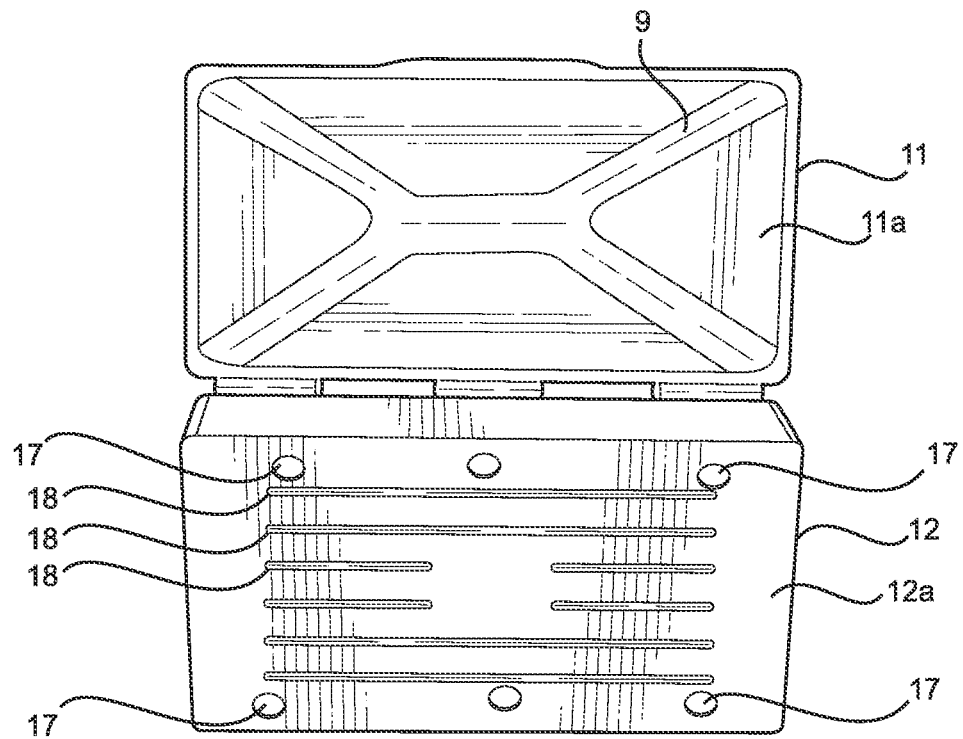
FIG. 2 shows a rear view of an embodiment of the protective fishing hook and lure cover.
Figure 3:
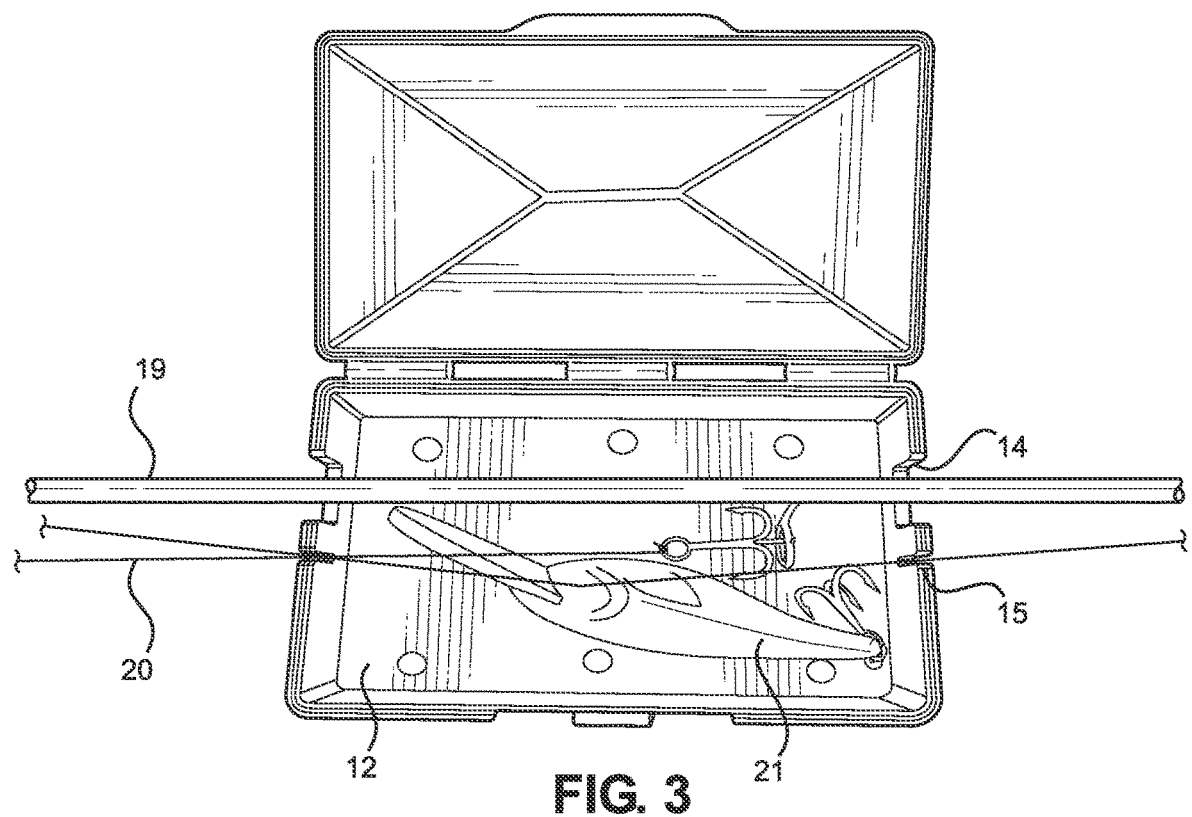
FIG. 3 shows a front demonstrative view of an embodiment of the protective fishing hook and lure cover in use.

Referring now to FIG. 2, there is shown a rear view of an embodiment of the protective fishing hook and lure cover. In the illustrated embodiment, a plurality of drainage apertures 17 are disposed on the base 12a of the second receptacle 12. The drainage apertures 17 are configured to be three apertures, evenly spaced out, in parallel, of the second receptacle 12, closer to the perimeter walls 12b and away from the middle, as to keep hooks from protruding out the apertures and causing injury, snags, or damage (as shown in FIG. 3). As such, any moisture or debris will be able to drain out of the second receptacle 12 when the protective fishing hook and lure cover 10 is placed into the closed configuration (as shown in FIG. 4). Alternatively, the pair of drainage apertures 17 may be placed on the first receptacle 11.

Furthermore, in the illustrated embodiment, the protective fishing hook and lure cover 10 comprises a plurality of ridges 18. The plurality of ridges 18, in the demonstrated embodiment, are placed on an external surface of the base 12a of the second receptacle 12. Alternatively, the plurality of ridges 18 may be disposed on an external surface of the base of the first receptacle 11. The plurality of ridges 18 are configured to provide additional structural support to the second receptacle 12 (or the first receptacle 11). Additionally, the plurality of ridges 18 provide frictional support to the protective fishing hook and lure cover when the protective fishing hook and lure cover is placed on a surface.

In the illustrated embodiment, the base 11a of the first receptacle 11 defines a hipped roof shape having four panels that come together. The panels consist of two triangular panels on the left side and right side of the first receptacle 11 and two trapezoidal panels on the front and on the back of the first receptacle 11. The panels come together and meet to form a peak ridge along the center line. The slots 15 appear directly under the center line of this peak ridge. As such, the volume of the center of the interior cavity defined by the first receptacle 11 is increased. The hipped roof shape is ideal, whereas the center of the hipped roof is at maximum pitch. This is to provide room for the lure, attached to the fishing line, which runs through the center of the second receptacle 12. The sloped in sides of the hipped roof shape is to prevent the lures, and other bulky items, from sliding away from the center and protruding through the drainage apertures 17 such as hooks protruding out the apertures and causing injury, snags, or damage (as shown in FIG. 3).

Furthermore, in the illustrated embodiment, the base 12a of the second receptacle 12 is flat. As such, the protective fishing hook and lure device will be structurally stable when placed upon a flat surface.

Referring now to FIG. 3, there is shown a front demonstrative view of an embodiment of the protective fishing hook and lure cover in use. In the illustrated embodiment, the protective fishing hook and lure cover is shown in an open configuration. The open configuration is defined where the first receptacle 11 is separated from the second receptacle. When the protective fishing hook and lure cover is in the open configuration, items may be placed into and removed from the protective fishing hook and lure cover.

In the demonstrated embodiment, a fishing rod 19 comprising a fishing line 20 and a fishing lure 21. In use, the user may place the fishing rod 19, fishing line 20 and fishing lure 21 into the second receptacle 12 of the protective fishing hook and lure cover. Specifically, the fishing rod 19 is inserted into the pair of apertures 14. The pair of apertures 14 are dimensioned to receive the fishing rod 19 therein. The fishing line 20 can be fed through the pair of slots 15 to prevent tangling.

Referring now to FIG. 4, there is shown a front demonstrative view of an embodiment of the protective fishing hook and lure cover in use. In the illustrated embodiment, the protective fishing hook and lure cover is in the closed configuration. The closed configuration is defined where the first receptacle 11 and the second receptacle 12 are placed in contact with each other. When the protective fishing hook and lure cover is placed into the closed configuration, the contents of the second receptacle 12 and the first receptacle 11 are protected. The pair of apertures 14 and the pair of slots 15 are positioned such that the fishing rod 19 and the fishing line 20 may pass through the protective fishing hook and lure cover when the protective fishing hook and lure cover is placed into the closed configuration.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A protective fishing hook and lure cover, consisting of:
   a first receptacle connected to a second receptacle via a hinge;
   the first receptacle and the second receptacle each consisting of a base with a plurality of perimeter walls extending upward therefrom;
   wherein the base of the second receptacle is flat;
   wherein the base of the second receptacle has a center line;
   a first latch member on the first receptacle and a second latch member on the second receptacle;
   wherein the first latch member and the second latch member are configured to hold the first receptacle and the second receptacle in a closed position;
   further consisting of a plurality of drainage apertures disposed on the base of the second receptacle;
   wherein the drainage apertures are evenly spaced away from the center line of the second receptacle near a front perimeter wall and a back perimeter wall;
   further consisting of a pair of slots defined in linear alignment on the center line of the second receptacle;
   wherein the pair of slots have a narrow open top, a narrow bottom surface parallel to the base of the second receptacle, a front surface and a back surface perpendicular to the base of the second receptacle;
   wherein the base of the first receptacle is a hipped roof shape;

wherein the hipped roof shape is consisting of a plurality of panels;

wherein the panels are consisting of two triangular panels on the left and right of the first receptacle and two trapezoidal panels on the front and the back of the first receptacle;

wherein the center of the first receptacle creates an interior cavity having a maximum pitch along a center line of the second receptacle wherein the slots are disposed along the center line of the second receptacle under the maximum pitch of the first receptacle;

further consisting of a pair of apertures each having an open top, a bottom surface parallel to the base of the second receptacle, a front surface and a back surface perpendicular to the base of the second receptacle;

wherein the front surface is nearest to the first latch member and the back surface is nearest to the back of the second receptacle;

further consisting of a width of the pair of apertures as defined as the distance span between the front and back of the surfaces;

wherein the pair of apertures are offset from the center of the second receptacle towards the back surface of the second receptacle;

wherein the pair of apertures are dimensioned to receive a fishing rod therethrough;

further consisting of a pair of slots defined between the plurality of perimeter walls between the first receptacle and the second receptacle;

the pair of slots defined in a linear alignment with each other;

the pair of slots disposed in a linear alignment with the pair of apertures;

wherein the drainage apertures are offset from the center line of the second receptacle to be nearer to the front perimeter wall than the center line and nearer to the back perimeter wall than the center line.

* * * * *